United States Patent [19]

Hara

[11] Patent Number: 4,541,581

[45] Date of Patent: Sep. 17, 1985

[54] DUSTTIGHT TAPE CASSETTE

[75] Inventor: Mitsuhiko Hara, Kawasaki, Japan

[73] Assignee: Victor Company of Japan, Ltd., Japan

[21] Appl. No.: 693,790

[22] Filed: Jan. 23, 1985

[51] Int. Cl.$^4$ .......................... G03B 1/04; G11B 15/32
[52] U.S. Cl. .................................... 242/198; 242/199;
360/132; 360/96.1
[58] Field of Search ....................... 242/192, 197–200;
360/93, 95, 96.1, 132, 137; 206/387, 389

[56] References Cited

U.S. PATENT DOCUMENTS 4,248,345  2/1981  Bowers .............................. 206/387
4,428,548  1/1984  Gotoh ................................ 242/199

FOREIGN PATENT DOCUMENTS

147174  9/1982  Japan ................................. 360/132

Primary Examiner—Leonard D. Christian
Attorney, Agent, or Firm—Andrus, Sceales, Starke & Sawall

[57] ABSTRACT

A tape cassette comprises a cassette case comprising a main cassette body having a front opening at the front thereof and a lid rotatably mounted on the main cassette body for normally covering the front opening, and a sliding body slidably provided within the main cassette body so that a part of the sliding body is extractable through the front opening for supporting a pair of tape rolls of a magnetic tape. The sliding body comprises guide parts for guiding the magnetic tape between the pair of tape rolls along the front of the sliding body and a cutout part through which the magnetic tape along the front of the sliding body traverses. When the tape cassette is not in use the sliding body is completely accommodated within the main cassette body and the cutout part is covered by a bottom plate of the main cassette body. When the tape cassette is in use and is loaded into a magnetic recording and reproducing apparatus the lid opens and a part of the sliding body is extracted through the front opening so that the cutout part is exposed outside the main cassette body to permit tape draw-out members of the apparatus to enter into the cutout part.

8 Claims, 28 Drawing Figures

DUSTTIGHT TAPE CASSETTE

BACKGROUND OF THE INVENTION

The present invention generally relates to tape cassettes, and more particularly to a tape cassette which is suited for being played on a magnetic recording and reproducing apparatus such as a video tape recorder, an audio tape recorder, and a data recorder.

Generally, a tape cassette which is played on a magnetic recording and reproducing apparatus having a tape loading mechanism for drawing a magnetic tape out of the loaded tape cassette and for loading the magnetic tape in a predetermined tape path, comprises a cutout part at the front of the tape cassette where the magnetic tape traverses. The cutout part of the tape cassette permits members of the tape loading mechanism to intercept and draw the magnetic tape out of the tape cassette. On the other hand, there is a recent trend to downsize the tape cassette and perform a high density recording of information signals with respect to the magnetic tape. When performing such a high density recording, it is essential that the magnetic tape in kept in a clean state having no dust particles or the like adhered thereon, and the tape cassette must be designed so as to prevent the dust particles or the like from entering into the tape cassette. However, the tape cassette of the type described above comprising the cutout part is not dusttight, because the dust particles or the like can easily enter into the tape cassette through the cutout part when the tape cassette is not in use. Hence, there is a problem in that the tape cassette of the type described above is unsuited for high density recording since the tape cassette is not completely dusttight.

The tape cassette may be accommodated within a case when the tape cassette is not in use. In this case, the case will prevent the dust particles or the like from entering into the tape cassette. However, the use of such a case is troublesome for the user in that the user must remove the tape cassette from the case every time the tape cassette is to be played and then accommodate the tape cassette within the case when the tape cassette is not in use. The removal of the tape cassette from the case and the accommodation of the tape cassette within the case will require the use of both hands of the user.

SUMMARY OF THE INVENTION

Accordingly, it is a general object of the present invention to provide a novel and useful tape cassette in which the problems described heretofore have been eliminated.

Another and more specific object of the present invention is to provide a tape cassette comprising a sliding body which is slidably accommodated within a cassette case which has a front opening covered by a lid. The sliding body supports a pair of tape rolls, and is provided with guides for guiding a magnetic tape and a cutout part into which tape draw-out members of a magnetic recording and reproducing apparatus enter. When the tape cassette according to the present invention is not in use, the tape cassette does not have an opening and is completely dusttight. When the tape cassette is to be played, the sliding body is extracted through the front opening of the cassette case by a certain amount so that the cutout part becomes exposed. The sliding body simply needs to be pushed back into the cassette case after the tape cassette is played. Hence, there is no need to perform troublesome operations to make the tape cassette dusttight when the tape cassette is not in use.

Other objects and further features of the present invention will be apparent from the following detailed description when read in conjunction with the accompanying drawings.

DETAILED DESCRIPTION

Figure 1A:
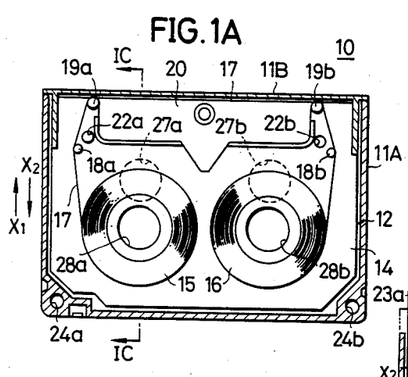
FIGS. 1A and 1B respectively are a plan view in cross section and a side view generally showing a tape cassette according to the present invention in a state where the tape cassette is not in use.
Figure 1B:
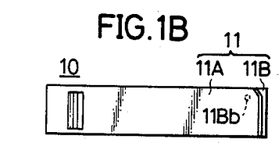
Figure 1C:
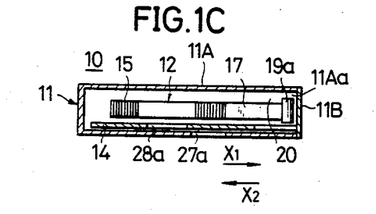
FIG. 1C is a perspective view showing a cross section along a line IC—IC in FIG. 1A.
Figure 2A:
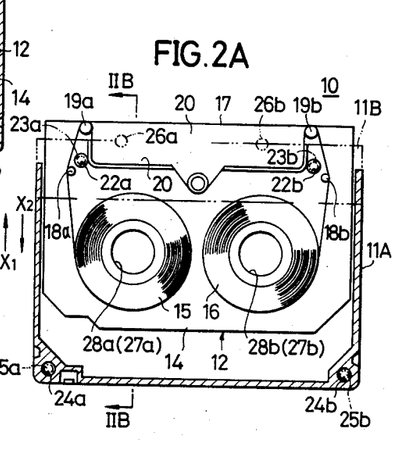
FIG. 2A is a plan view in cross section generally showing the tape cassette shown in FIG. 1A in a state where the tape cassette is in use.
Figure 2B:
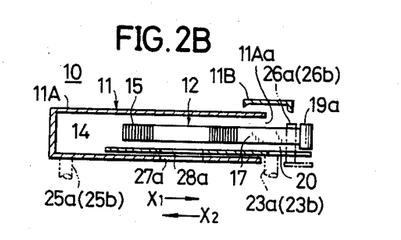
FIG. 2B is a perspective view in a cross section along a line IIB—IIB in FIG. 2A.

First, a general description will be given with respect to an embodiment of a tape cassette according to the present invention, by referring to FIGS. 1A through 1C, 2A, and 2B. FIGS. 1A through 1C show a tape cassette 10 in a state where the tape cassette 10 is not in use, and FIGS. 2A and 2B show the tape cassette 10 in a state where the tape cassette 10 is in use.

As shown in FIGS. 1A through 1C, the tape cassette 10 generally comprises a box-shaped cassette case 11, and a sliding body 12 which is slidably accommodated within the cassette case 11. The sliding body 12 is slidable in an arrow direction $X_1$.

The cassette case 11 comprises a main cassette body 11A which is made up of a bottom plate, a top plate, side plates, and a rear plate, and a lid 11B which is provided on the main cassette body 11A and is free to open and close. Normally, the lid 11B is closed and covers a rectangular opening 11Aa at the front of the main cassette body 11A.

The sliding body 12 comprises a base plate 14, and a supply tape roll 15 and a take-up tape roll 16 are arranged on the base plate 14. Guide poles 18a and 18b and guide rollers 19a and 19b are also provided on the base plate 14 so as to guide a magnetic tape 17 along the front opening 11Aa. A cutout part 20 into which members of a magnetic recording and reproducing apparatus enters to draw the tape 17 out of the cassette case 11, is formed in the sliding body 12 between the guide rollers 19a and 19b.

When the tape cassette 10 is not in use, the sliding body 12 assumes a position slid in an arrow direction $X_2$ to the limit, and is completely accommodated within the cassette case 11 as shown in FIGS. 1A through 1C. In this state, the cutout part 20 is covered by the top and bottom plates of the main cassette body 11A and the lid 11B. Holes 27a and 27b in the bottom plate of the main cassette body 11A for receiving reel driving shafts, and holes 28a and 28b in the base plate 14 for receiving the reel driving shafts are completely deviated from each other, and the holes 27a and 27b are covered by the bottom plate of the main cassette body 11A. The lid 11B is closed. The cassette case 11 is a dusttight case having no opening when the lid 11B is closed, and it is possible to effectively prevent dust particles or the like from entering into the cassette case 11. Thus, the tape 17 is satisfactorily protected from the dust particles or the like which may adhere on the tape 17.

The tape cassette 10 is loaded into the magnetic recording and reproducing apparatus (hereinafter simply referred to as an apparatus) in the state shown in FIGS. 2A and 2B. In other words, the lid 11B rotates by approximately 90° about a pin 11Bb during the tape cassette loading process. As the lid 11B opens, the sliding body 12 slides in the arrow direction $X_1$ over a predetermined distance and a part of the sliding body 12 is extracted from the main cassette body 11A. As a result, the cutout part 20 projects from the cassette case 11 and the cutout part 20 becomes exposed outside the main cassette body 11A. Further, the holes 28a and 28b in the base plate 14 coincide with the respective holes 27a and 27b in the main cassette body 11A. Positioning holes 22b and 22a formed on the right and left parts of the base plate 14 fit over respective positioning pins 23b and 23a of the apparatus, and positioning holes 24b and 24a formed on the right and left parts at the rear of the main cassette body 11A fit over respective positioning pins 25b and 25a of the apparatus. Hence, the tape cassette 10 is loaded into the apparatus in a state where the positioning is carried out with respect to both the sliding body 12 and the cassette case 11. When the tape cassette 10 is loaded into the apparatus, tape draw-out members 26a and 26b of the apparatus relatively enter within the cutout part 20 and confront the inner surface of the tape 17 between the guide rollers 19a and 19b. The tape draw-out members 26a and 26b move to intercept and draw the tape 17 out of the cassette case 11, and a tape loading operation is performed to load the tape 17 in a predetermined tape path. The magnetic recording or reproduction is performed as the tape 17 moves in the predetermined tape path.

When the tape cassette 10 is ejected from the apparatus after the magnetic recording or reproduction is completed. As the tape cassette 10 is ejected from the apparatus, the lid 11B closes, and the sliding body 12 slides in the arrow direction $X_2$ and is returned within the main cassette body 11A. Accordingly, the tape cassette 10 assumes the state shown in FIGS. 1A through 1C in which the sliding body 12 is completely accommodated within the main cassette body 11A and the lid 11B is closed. In this state, the holes 27a and 27b are covered by the base plate 14, and the tape cassette 10 is ejected from the apparatus in the dusttight state.

Figure 3:
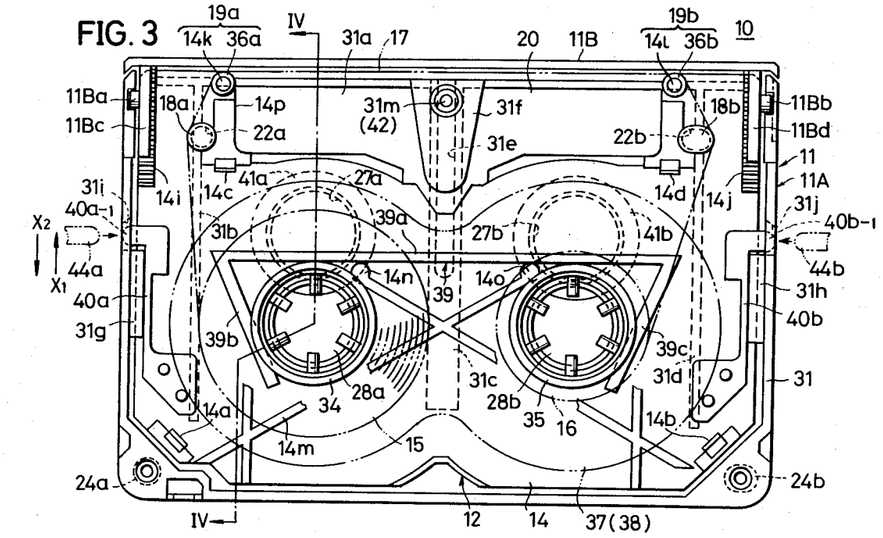
FIG. 3 is a plan view showing an embodiment of the tape cassette according to the present invention in a state where the tape cassette is not in use, with an upper cassette half of a cassette case and a top plate of a sliding body removed.

Next, a description will be given with respect to the construction of the tape cassette 10 in more detail, by referring to FIG. 3 and the following figures. In FIG. 3 and the following figures, those parts which are the same as those essentially corresponding parts in FIGS. 1A through 1C, 2A, and 2B are designated by the same reference numerals.

Figure 4:
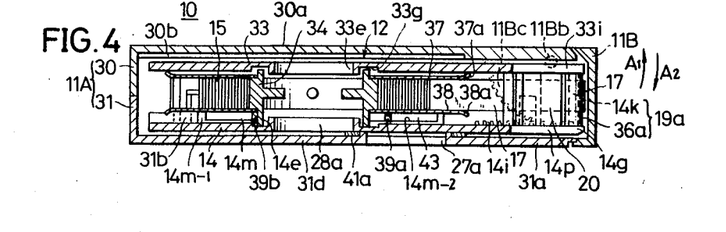
FIG. 4 is a perspective view in a cross section along a line IV—IV in FIG. 3.
Figure 5:
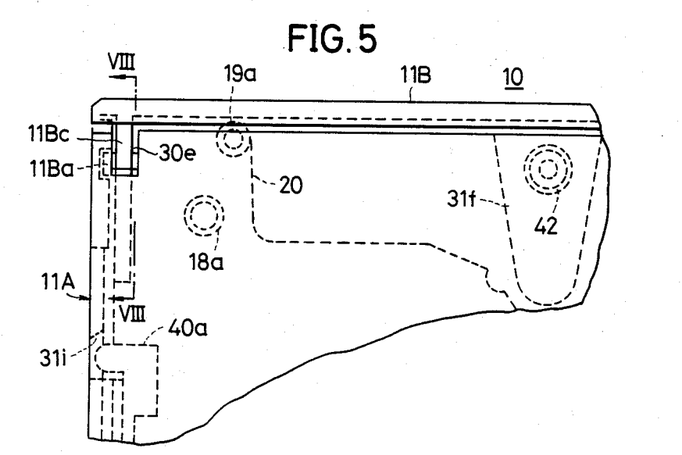
FIG. 5 is a plan view showing a part of the tape cassette near a lip thereof in a state where the tape cassette is not in use.
Figure 6:
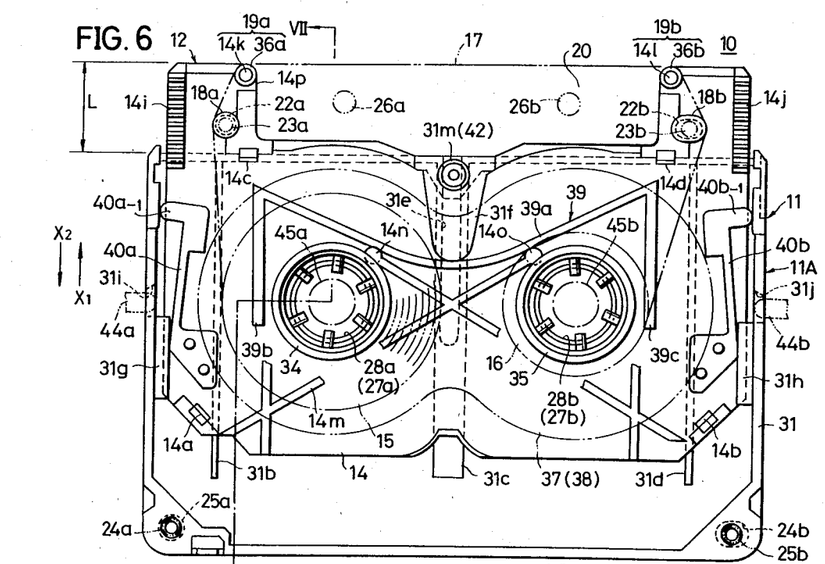
FIG. 6 is a plan view showing the tape cassette shown in FIG. 3 in a state where the tape cassette is in use.
Figure 7:
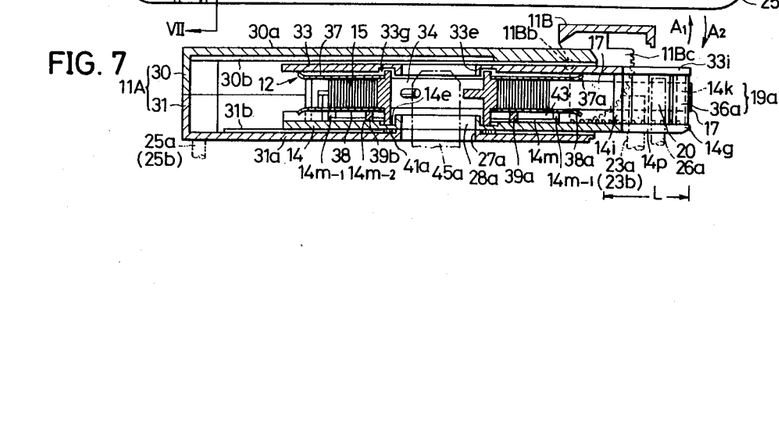
FIG. 7 is a perspective view in a cross section along a line VII—VII in FIG. 6.
Figure 8:
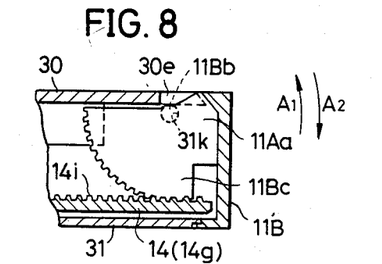
FIG. 8 is a perspective view in a cross section along a line VIII—VIII in FIG. 5 showing the relationship between a fan-shaped gear of the lid and a rack on a base plate of the sliding body.
Figure 9:
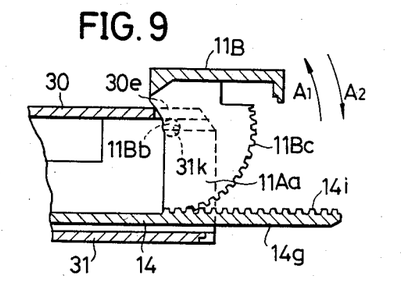
FIG. 9 shows the relationship between the fan-shaped gear and the rack when the tape cassette is in use, in correspondence with FIG. 8.

FIGS. 3 through 5 and 8 show the tape cassette 10 not in use, and FIGS. 6, 7, and 9 show the tape cassette 10 in use.

As shown in FIG. 4, the main cassette body 11A of the cassette case 11 is made up of an upper half 30 and a lower half 31 which are connected to each other.

Figure 10A:
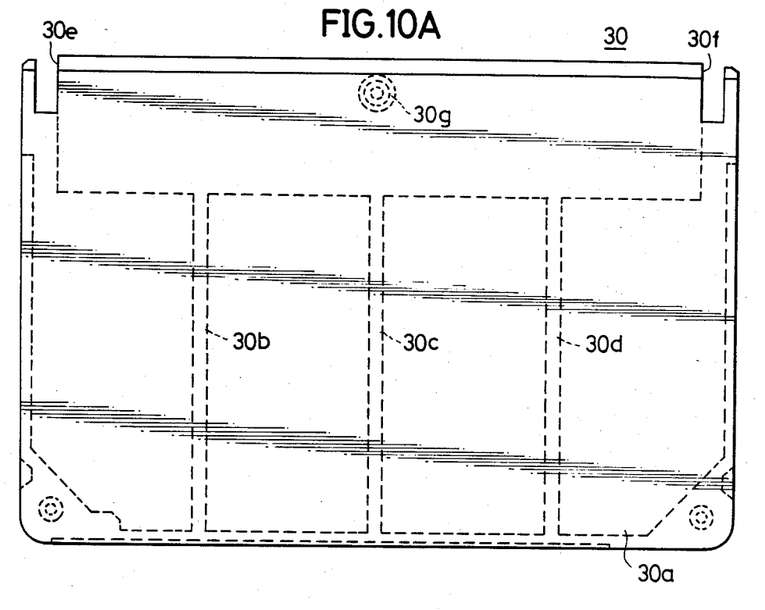
FIGS. 10A and 10B respectively are a plan view and a side view showing an upper half of the cassette case.
Figure 10B:
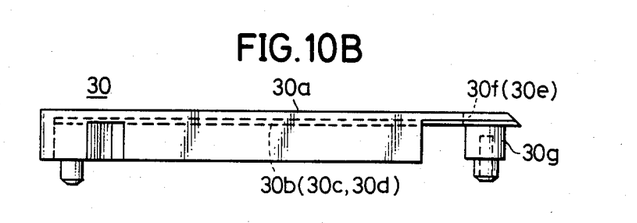

The upper half 30 has the shape shown in FIGS. 10A and 10B. A top plate 30a of the upper half 30 has no opening, and ribs 30b, 30c, and 30d for permitting smooth sliding of the sliding body 12 are provided on the lower surface of the top plate 30a.

Figure 11A:
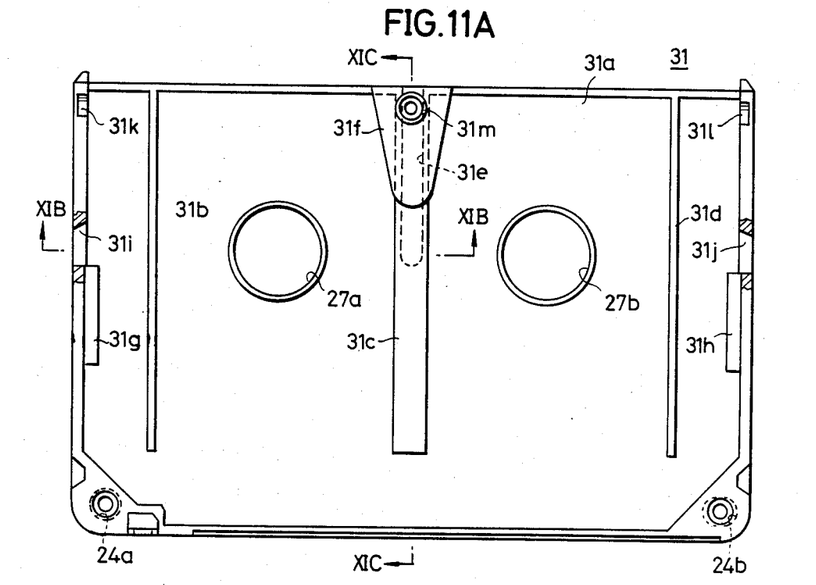
FIG. 11A is a plan view showing a lower half of the cassette case.
Figure 11B:
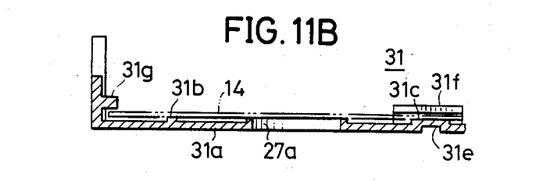
FIGS. 11B and 11C respectively are perspective views along a line XIB—XIB and a line XIC—XIC in FIG. 11A showing the shape of various parts of the lower half.
Figure 11C:
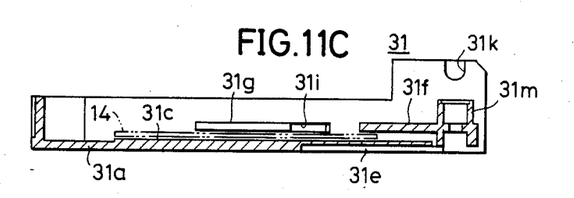

The lower half 31 has the shape shown in FIGS. 11A through 11C. A cutout part into which the tape draw-out members 26a and 26b of the apparatus enter, is not formed in a bottom plate 31a of the lower half 31. Only the holes 27a and 27b are formed in the bottom plate 31a. As will be described later on in the specification, the holes 27a and 27b are formed at positions toward the front edge of the bottom plate 31a as shown in FIG. 11A with respect to a center in the vertical direction so that the holes 27a and 27b are covered by the sliding body 12 when the tape cassette 10 is not in use. In addition, ribs 31b, 31c, and 31d for supporting and permitting smooth sliding of the sliding body 12 are provided on the upper surface of the bottom plate 31a. An erroneous insertion preventing groove 31e is formed on the lower surface of the bottom plate 31a so as to prevent the insertion of the tape cassette 10 into the apparatus from the wrong side of the tape cassette 10.

An arm 31f which extends from the front edge of the bottom plate 31a towards the rear edge, and guide ribs 31h and 31g which respectively project from the right and left side walls, are also formed on the lower half 31.

As will be described later, the arm 31f and the guide ribs 31g and 31h cooperate and guide the base plate 14 of the sliding body 12 and position the sliding body 12 in the height direction of the sliding body 12. In addition, elongated openings 31j and 31i are formed on the right and left side walls of the lower half 31, at the same height position as and adjacent to the respective guide ribs 31h and 31g.

The upper and lower halves 30 and 31 and the lid 11B are assembled together, and the upper and lower havles 30 and 31 are fixed together by three screws. Among the three screws, two screws are provided on the right and left near the rear surfaces of the upper and lower halves 30 and 31, and the remaining one screw is provided at a horizontal center near the front opening 11Aa.

As shown in FIGS. 3, 5, and 8, the pins 11Ba and 11Bb of the lid 11B are fitted into respective depressions 31k and 31 l shown in FIG. 11A of the lower half 31, and the lid 11B is rotatable in arrow directions $A_1$ and $A_2$. The lid 11B normally covers the front opening 11Aa as shown in FIGS. 3 through 5. The lid 11B integrally comprises right and left fan-shaped gears 11Bd and 11Bc. Cutouts 30e and 30f are formed in the upper half 30 in relation to the fan-shaped gears 11Bc and 11Bd, so as to permit the lid 11B to open.

Figure 12A:
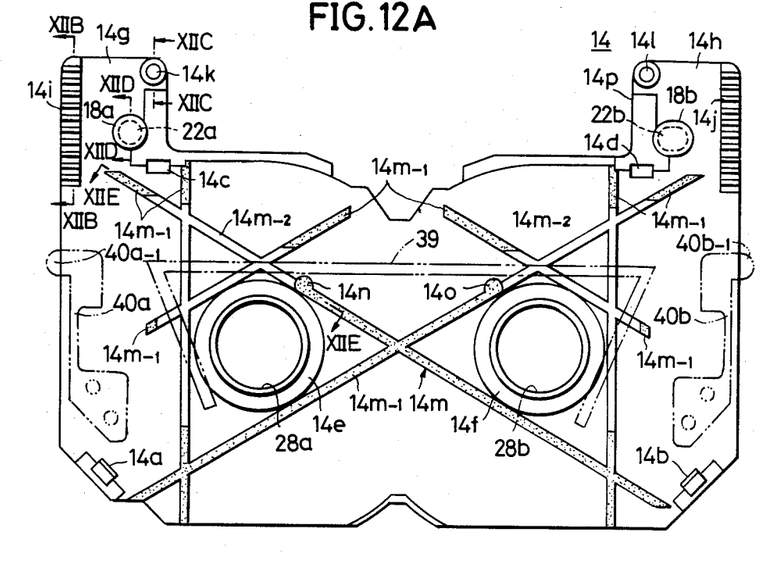
FIG. 12A is a plan view showing the base plate of the sliding body.

As shown in FIG. 4, reel hubs 34 and 35 and the like are provided between the base plate (lower slide plate) 14 shown in FIG. 12A and a top plate (upper slide plate) 33.

Figure 14:
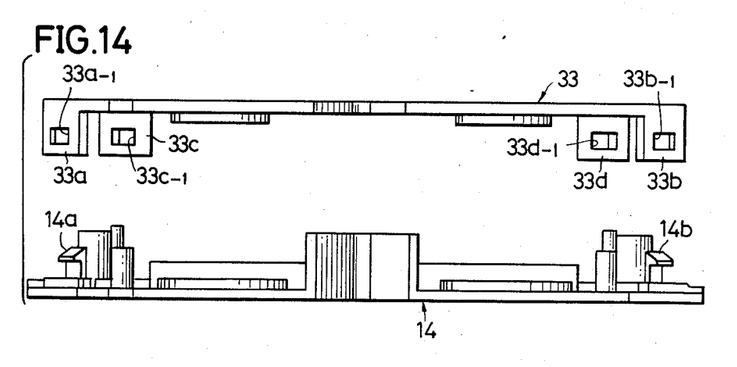
FIG. 14 is an elevation showing the base plate and the top plate of the sliding body in a mutually confronting manner.

The base plate 14 and the top plate 33 are assembled by mounting the top plate 33 on top of the base plate 14 as shown in FIG. 14. Claws 14a through 14d of the base plate 14 are fitted into respective openings 33a-1 through 33d-1 of downwardly extending ribs 33a through 33d of the top plate 33. The vertical separation between the base plate 14 and the top plate 33 is determined by the downwardly extending ribs 33a through 33d and the like.

Figure 13:
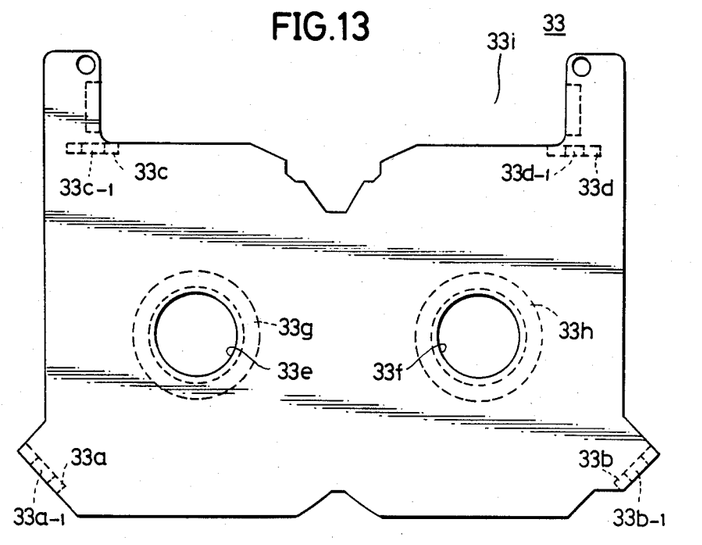
FIG. 13 is a plan view showing the top plate of the sliding body.

Holes 33e and 33f for receiving the reel driving shafts are formed in the top plate 33 in correspondence with the holes 28a and 28b of the base plate 14. As shown in FIG. 4, upper and lower ring shaped projecting parts of the reel hub 34 are respectively fitted into a ring shaped groove 33g of the top plate 33 and a ring shaped groove 14e of the base plate 14, and the reel hub 34 is rotatably supported opposing the holes 33e and 28a. Although not shown in FIG. 4, upper and lower ring shaped projecting parts of the other reel hub 35 are respectively fitted into a ring shaped groove 33h of the top plate 33 and a ring shaped groove 14f of the base plate 14, and the reel hub 34 is rotatably supported opposing the holes 33f and 28b.

A cutout opening 14p is formed at the front of the base plate 14, and a cutout opening 33i is formed at the front of the top plate 33. The cutout opening 14p is formed between poles 14k and 14l which will be described later, and has an approximately rectangular shape having the shorter sides at the poles 14k and 14l. The cutout opening 33i has a shape substantially corresponding to the shape of the cutout opening 14p. The cutout part 20 described before is an approximately rectangular parallelopiped space defined by the cutout opening 14p which constitutes the bottom surface of the space and the output opening 33i which constitutes the upper surface of the space.

Figure 12B:
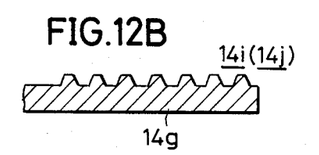
FIGS. 12B through 12E respectively are perspective views in cross section along lines XIIB—XIIB, XIIC—XIIC, XIID—XIID, and XIIE—XIIE in FIG. 12A showing the shape of various parts of the base plate of the sliding body.
Figure 12C:
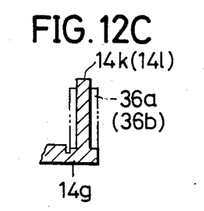
Figure 12D:
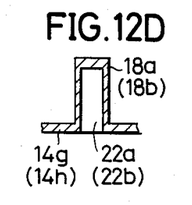
Figure 12E:
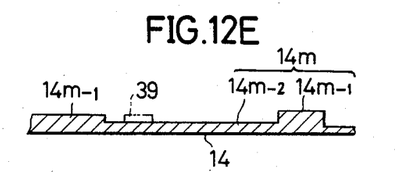

As shown in FIG. 12A, racks 14i and 14j shown in FIG. 12B which mesh with fan-shaped gears 11Bc and 11Bd shown in FIG. 8, poles 14k and 14l shown in FIG. 12C, and the hollow cylinder shaped guide poles 18a and 18b shown in FIG. 12D are formed on respective projection portions 14g and 14h on both sides of the cutout opening 14p. The hollow portions of the guide poles 18a and 18b function as the positioning holes 22a and 22b. Collars 36a and 36b are rotatably provided on the respective poles 14k and 14l as shown in FIG. 3. A plurality of ribs 14m which exist vertical and oblique directions are formed on the upper surface of the base plate 14 as shown in FIG. 12A. As shown in FIG. 12E, the ribs 14m comprise high rib portions 14m-1 having a high upward projection and low rib portions 14m-2 having a low upward projection.

Liners 37 and 38 having the shape shown in FIGS. 3 and 4 are respectively provided above and below the reel hubs 34 and 35. The lower liner 38 is supported by the high rib portion 14m-1 and a brake member 39. As shown in FIG. 4, the peripheral edge of the upper liner 37 is formed as an upwardly curled portion 37a, and the peripheral edge of the lower liner 38 is formed as a downwardly curled portion 38a. Accordingly, during the recording or reproduction which will be described later, the upper and lower edges of the tape 17 are guided by the curled portions 37a and 38a and smoothly enters between the upper and lower liners 37 and 38. Thus, the tape 17 can move smoothly and stably.

The tape rolls 15 and 16 are formed around the periphery of the respective reel hubs 34 and 35, and the upper and lower surfaces of the tape rolls 15 and 16 are supported by the respective upper and lower liners 37 and 38.

As shown in FIGS. 3 and 4, the brake member 39 comprises a rod portion 39a and arm portions 39b and 39c formed on both ends of the rod portion 39a. The brake member 39 is molded from a synthetic resin. The brake member 39 is placed on the lower rib portion 14m-2 within a flat space 43 which is formed between the lower rib portion 14m-2 and the lower liner 38, in a state where the arm portions 39b and 39c confront the respective reel hubs 34 and 35.

Locking members 40b and 40a are mounted on the right and left sides of the base plate 14.

Next, a description will be given with respect to the operation of the tape cassette 10 having the construction described heretofore when the tape cassette 10 is in use and when the tape cassette 10 is not in use, by referring especially to FIGS. 3 through 9.

When the tape cassette 10 is not in use, the lid 11B is closed and covers the front opening 11Aa and the sliding body 12 is completely accommodated within the main cassette body 11A as shown in FIGS. 3 through 5. The cutout part 20 is covered by the front portion of the bottom plate 31a of the lower half 31, the front portion of the top plate 30a of the upper half 30, and the lid 11B. The holes 28a and 28b in the base plate 14 are completely deviated from the holes 27a and 27b in the bottom plate 31a of the lower half 31, and the holes 27a and 27b are covered by the base plate 14. Ring-shaped members 41a and 41b for preventing entrance of dust particles or the like are provided on the periphery of the respective openings 27a and 27b. The holes 28a and 28b are covered by the bottom plate 31a of the lower half 31. The elongated openings 31i and 31j are covered by fingers 40a-1 and 40b-1 of the locking members 40a and 40b.

Accordingly, the dust particles or the like are positively prevented from entering through the front opening 11A*a*, the cutout part 20, the holes 27*a*, 27*b*, 28*a*, and 28*b*, and the elongated openings 31*i* and 31*j*. The tape cassette 10 is dusttight in this state, and the tape 17 is sufficiently protected from dust particles or the like.

In addition, the fingers 40*a*-1 and 40*b*-1 are engaged to the respective elongated openings 31*i* and 31*j*, and the sliding body 12 is locked in an immovable state with respect to the cassette case 11. On the other hand, the fan-shaped gears 11B*c* and 11B*d* of the lid 11B mesh with the respective racks 14*i* and 14*j* on the base plate 14 of the sliding body 12 as shown in FIG. 8, and the lid 11B is indirectly locked in the closed position. Hence, the lid 11B is prevented from accidentally opening when the tape cassette 10 is being handled, and the dusttight state of the tape cassette 10 is maintained.

The reel hubs 34 and 35 are pushed and braked by the arm portions 39*b* and 39*c* of the brake member 39. Further, the right and left sides of the base plate 14 of the sliding body 12 are stopped by the guide ribs 31*h* and 31*g*, and the play of the sliding body 12 within the cassette case 11 is restricted in the height direction.

Projections 30*g* and 31*m* of the upper and lower halves 30 and 31 confront each other and form a pole 42. This pole 42 has two functions. First, the pole 42 restricts the tape 17 from entering into the cutout part 20 even when the part of the tape 17 along the front of the cutout part 20 slackens. Secondly, the pole 42 reinforces the front of the cassette case 11 near the front opening 11A*a* where the tape cassette 10 is weakest.

The tape cassette 10 is inserted into a cassette holder (not shown) of the apparatus (not shown) for the lid 11B first. The tape cassette 10 moves together with the cassette holder and is loaded into a predetermined cassette loading position.

As the tape cassette 10 moves to the cassette loading position, lock releasing members 44*a* and 44*b* of the apparatus enters within the elongated openings 31*i* and 31*j* of the cassette case 11. Hence, the locking members 40*a* and 40*b* are resiliently deformed, and the fingers 40*a*-1 and 40*b*-1 escape from the elongated openings 31*i* and 31*j*. As a result, the locking of the sliding body 12 with respect to the cassette case 11 is cancelled, and the indirect locking of the lid 11B is also cancelled so that the lid 11B may be opened. Next, a lid opening mechanism (not shown) of the apparatus opens the lid 11B in the arrow direction $A_1$ by approximately 90° as shown in FIG. 7. As the lid 11B opens, the sliding body 12 is driven at the both sides thereof through the fan-shaped gears 11B*c* and 11B*d* and the racks 14*i* and 14*j*, and the sliding body 12 moves in the arrow direction $X_1$ with respect to the cassette case 11. In other words, the sliding body 12 moves in the arrow direction $X_1$ by a predetermined stroke L responsive to the opening of the lid 11B, and the front part of the sliding body 12 becomes exposed through the front opening 11A*a*. The sliding body 12 moves smoothly over the ribs 31*b* through 31*d* in a state where the sliding body 12 is driven at both sides thereof and the right and left ends of the base plate 14 are guided by the guide ribs 31*h* and 31*g*.

Therefore, as shown in FIGS. 6 and 7, a part of the sliding body 12 is extracted from the main cassette body 11A. The cutout part 20 and the positioning holes 22*a* and 22*b* become exposed, and the holes 28*a* and 28*b* coincide with the respective holes 27*a* and 27*b*. The tape cassette 10 reaches the cassette loading position in this state. A reel driving shaft 45*a* of the apparatus relatively enters into the reel hub 34 through the openings 27*a* and 28*b* which coincide, while a reel driving shaft 45*b* of the apparatus relatively enters into the reel hub 35 through the openings 27*b* and 28*b* which coincide. In addition, the tape draw-out members 26*a* and 26*b* of the apparatus relatively enter into the cutout part 20. The positioning holes 22*a* and 22*b* of the sliding body 12 fit over the respective positioning pins 23*a* and 23*b*, and the positioning holes 24*a* and 24*b* of the main cassette body 11A fit over the respective positioning pins 25*a* and 25*b*. Hence, the tape cassette 10 is loaded into the cassette loading position in a state where the sliding body 12 and the main cassette body 11A are mutually and positionally restricted in the arrow directions $X_1$ and $X_2$. The base plate 14 of the sliding body 12 is held at three positions by the guide ribs 31*g* and 31*h* and the arm 31*f*, and the sliding body 12 is thus restricted in the height direction thereof.

On the other hand, as shown in FIG. 6, the central part of the rod portion 39*a* of the brake member 39 is pushed by the arm 31*f* as the sliding body 12 slides in the arrow direction $X_1$. Moreover, the right and left of the central part of the rod portion 39*a* are stopped by stopping projections 14*o* and 14*n* which are integrally formed on the high rib portion 14*m*-1. As a result, the rod portion 39*a* is resiliently deformed and the arm portions 39*b* and 39*c* separate from the respective reel hubs 34 and 35. Consequently, the braking with respect to the reel hubs 34 and 35 is cancelled.

As described before, the tape loading operation is performed by the tape draw-out members 26*a* and 26*b* with respect to the tape cassette 10 which assumes the cassette loading position, and the magnetic recording or reproduction is carried out thereafter. The tape rolls 15 and 16 rotate stably by smoothly sliding between the upper and lower liners 37 and 38. The tape rolls 15 and 16 are supported on the lower liner 38, and the diameter of the tape rolls 15 and 16 increases or decreases depending on whether the tape 17 is paid out or taken up by the tape roll.

During a process in which the tape cassette 10 is ejected from the apparatus, the lid 11B rotates in the arrow direction $A_2$ and closes. Responsive to the closing of the lid 11B, the sliding body 12 slides in the arrow direction $X_2$ and becomes completely accommodated within the main cassette body 11A. Hence, the tape cassette 10 is ejected from the apparatus in the original state shown in FIGS. 3 through 5. The brake member 39 which is resiliently deformed as shown in FIG. 6 also acts on the sliding body 12 so as to push the sliding body 12 back into the main cassette body 11A and ensures smooth sliding of the sliding body 12.

Next, a description will be given with respect to a modification of the tape cassette 10 described heretofore, by referring to FIGS. 15A, 15B, 16A, and 16B. The modification is the same as the embodiment described before except that the modification is provided with at least one torsion coil spring for urging the lid in the closing direction.

Figure 15A:
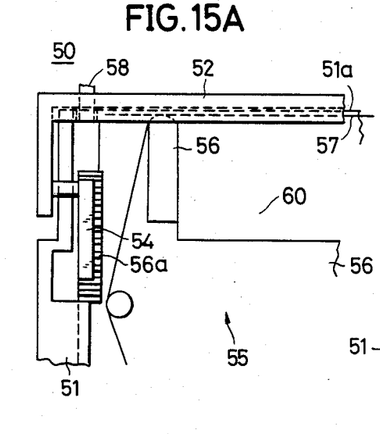
FIGS. 15A and 15B respectively are a partial plan view and a side view in cross section showing a modification of the tape cassette shown in FIGS. 3 and 4 in a state where the tape cassette is not in use.
Figure 15B:
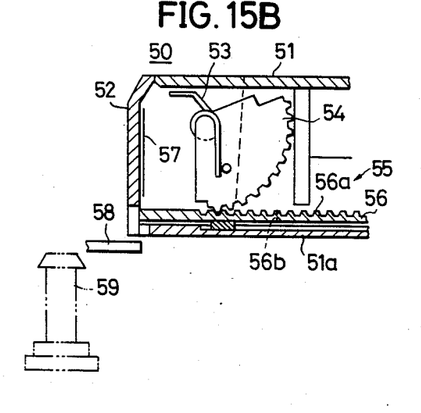

A lid 52 which is rotatably provided on the front of a main cassette body 51 of a tape cassette 50, is urged in the closing direction by a torsion coil spring 53. A fan-shaped gear 54 which is integrally provided on the lid 52 meshes with a rack 56*a* on a base plate 56 of a sliding body 55.

In a state where the lid 52 is closed, the sliding body 55 is completely accommodated within the main cassette body 51 as shown in FIGS. 15A and 15B. In other words, a cutout part 60 of the sliding body 55 is covered by a bottom plate 51*a* of the main cassette body 51 and is not exposed. A tape guide 56c for guiding a magnetic tape 57 beside the cutout part 60, has a tip end which is formed as an arcuate surface.

Figure 16A:
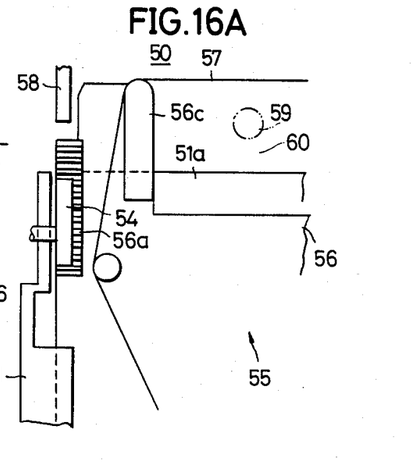
FIGS. 16A and 16B respectively are a partial plan view and a side view in cross section showing the tape cassette shown in FIGS. 15A and 15B in a state where the tape cassette is in use.
Figure 16B:
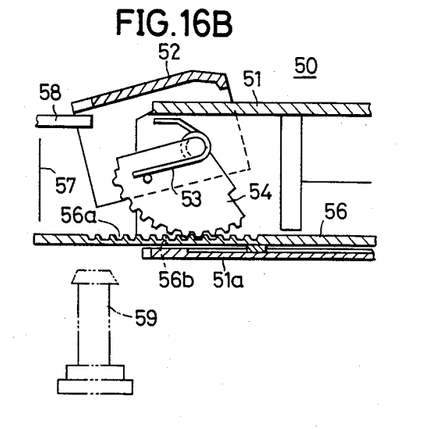

As shown in FIGS. 16A and 16B, the lid 52 is engaged and opened by a lid opening member 58 of the apparatus. The sliding body 55 slides responsive to the opening of the lid 52, and a part of the sliding body 55 is extracted from the main cassette body 51. As a result, the cutout part 60 becomes exposed so that a tape draw-out member 59 of the apparatus may enter into the cutout part 60.

The lid 52 closes due to the force exerted by the torsion coil spring 53, and the sliding body 55 is pushed back and accommodated within the main cassette body 51 as the lid 52 closes. The torsion coil spring 53 may be provided on only on said of the main cassette body 51 or on both sides of the main cassette body 51.

Further, the present invention is not limited to these embodiments, but various variations may be made without departing from the scope of the present invention.

What is claimed is:

1. A tape cassette comprising:
   a cassette case comprising a main cassette body having a front opening at the front thereof and a lid rotatably mounted on said main cassette body for normally covering said front opening, said main cassette body comprising a top plate, a bottom plate, a rear plate, and right and left side plates, said top and bottom plates each having a linear front edge at said front opening and having no cutout part at said front opening; and
   a sliding body slidably provided within said main cassette body so that a part of said sliding body is extractable through said front opening for supporting a pair of tape rolls of a magnetic tape, said sliding body comprising guide parts for guiding the magnetic tape between said pair of tape rolls along the front of said sliding body and a cutout part through which the magnetic tape along said front of said sliding body traverses,
   when said tape cassette is not in use said sliding body being completely accommodated within said main cassette body and said cutout part being covered by the bottom plate of said main cassette body,
   when said tape cassette is in use and is loaded into a magnetic recording and reproducing apparatus said lid opening and a part of said sliding body being extracted through said front opening so that said cutout part is exposed outside said main cassette body to permit tape draw-out means of said apparatus to enter into said cutout part.

2. A tape cassette as claimed in claim 1 in which said guide parts comprise a guide roller provided in a vicinity of the right front edge of said sliding body and a guide roller provided in a vicinity of the left front edge of said sliding body, said cutout part comprises an approximately rectangular parallelopiped space having an approximately rectangular bottom surface with the shorter sides at the guide rollers, and when said tape cassette is not in use the bottom of said cutout part is covered by the bottom plate of said main cassette body and the front of said cutout part is covered by said lid.

3. A tape cassette as claimed in claim 1 in which said sliding body comprises upper and lower slide plates which are connected together and accommodates said pair of tape rolls between said upper and lower slide plates, said cutout part comprises an approximately rectangular parallelopiped space having a bottom surface defined by a first cutout opening formed in said lower slide plate and having an upper surface defined by a second cutout opening formed in said upper slide plate immediately above said first cutout opening, and when said tape cassette is not in use said second cutout opening is covered by the top plate of said main cassette body, said first cutout opening is covered by the bottom plate of said main cassette body, and the front of said cutout part is covered by said lid.

4. A tape cassette as claimed in claim 1 in which said bottom plate of said main cassette body comprises first holes into which reel driving shafts of said apparatus enters when said tape cassette is loaded into said apparatus, said sliding body comprises second holes at the positions of said tapes rolls, when said tape cassette is not in use said first holes and said second holes are deviated from each other so that said first holes are covered by said sliding body, and when a part of said sliding body is extracted from said main cassette body and said cutout part is exposed said first holes coincide with said second holes.

5. A tape cassette as claimed in claim 1 which further comprises a mechanism for sliding said sliding body in response to the rotation of said lid so that a part of said sliding body is extracted from said main cassette body as said lip opens and said sliding body is returned back into said main cassette body as said lid closes.

6. A tape cassette as claimed in claim 5 in which said mechanism comprises a fan-shaped gear supported about a pin on said lid, and a rack formed on said sliding body for meshing with said fan-shaped gear.

7. A tape cassette as claimed in claim 1 which further comprises a locking mechanism for locking said sliding body with respect to said main cassette body so that said sliding body does not project through the front opening of said main cassette body when said tape cassette is not in use, and the locking of said sliding body with respect to the main cassette body by said locking mechanism is cancelled when said tape cassette is loaded into said apparatus.

8. A tape cassette as claimed in claim 1 which further comprises a resilient brake member resiliently deformed for braking said tape rolls when said tape cassette is not in use, said brake member pushing a part of said sliding body out of said main cassette body through the front opening as said lid opens and said brake member returns to a free state from the deformed state.

* * * * *

UNITED STATES PATENT AND TRADEMARK OFFICE
CERTIFICATE OF CORRECTION

PATENT NO. : 4,541,581
DATED : September 17, 1985
INVENTOR(S) : MITSUHIKO HARA

It is certified that error appears in the above-identified patent and that said Letters Patent is hereby corrected as shown below:

In the Heading: Add the following "[30] Foreign Application Priority Data January 25, 1984 [JP] Japan . . . . 59-11637"

Column 2, Line 29, Cancel "lip" and substitute therefor---lid---;

Column 5, Line 10, Cancel "havles" and substitute therefor---halves---;

Column 7, Line 31, Cancel "for" and substitute therefor---from---;

Column 7, Line 53, Cancel "L" and substitute therefor---L---;

Column 9, Line 16, after "only" cancel "on" and substitute therefor---one---;

Column 9, Line 16, Cancel "said" and substitute therefor---side---.

Signed and Sealed this

Eighteenth Day of February 1986

[SEAL]

Attest:

DONALD J. QUIGG

Attesting Officer

Commissioner of Patents and Trademarks